(12) United States Patent
Frenkiel et al.

(10) Patent No.: US 7,877,614 B2
(45) Date of Patent: Jan. 25, 2011

(54) PROCESS FOR SECURING THE ACCESS TO THE RESOURCES OF AN INFORMATION HANDLING SYSTEM (I.H.S.)

(75) Inventors: Michel Frenkiel, Valbonne (FR); Eric Mathieu, Golfe Juan (FR)

(73) Assignee: MOBILEGOV France, S.A.R.L., Sophia Antipolis (FR)

( * ) Notice: Subject to any disclaimer, the term of this patent is extended or adjusted under 35 U.S.C. 154(b) by 1172 days.

(21) Appl. No.: 11/292,181

(22) Filed: Dec. 1, 2005

(65) Prior Publication Data

US 2006/0117377 A1    Jun. 1, 2006

(30) Foreign Application Priority Data

Dec. 1, 2004    (EP)    .................................. 04368072

(51) Int. Cl.
*G06F 11/30*    (2006.01)
*H04L 29/06*    (2006.01)

(52) U.S. Cl. ...................................... 713/189; 713/165
(58) Field of Classification Search ................. 713/165, 713/167, 187, 189, 2, 180; 726/2
See application file for complete search history.

(56) References Cited

U.S. PATENT DOCUMENTS 6,148,407 A * 11/2000 Aucsmith ..................... 726/16
6,694,434 B1 * 2/2004 McGee et al. ............... 713/189
2002/0026576 A1 * 2/2002 Das-Purkayastha et al. . 713/156
2003/0159044 A1    8/2003 Doyle et al. ................. 713/176

FOREIGN PATENT DOCUMENTS

EP    1 182 534 A2    2/2002
WO    WO 98/42098    9/1998

* cited by examiner

*Primary Examiner*—Matthew B Smithers
*Assistant Examiner*—Ali S Abyaneh
(74) *Attorney, Agent, or Firm*—Saile Ackerman LLC; Stephen B. Ackerman; Rosemary L. S. Pike

(57) ABSTRACT

A process for securing the access to the resources of an Information Handling System (I.H.S.) in accordance with the present invention which involves the steps of:

initiating a first preliminary qualification process for the purpose of generating a system qualification file (SQF) comprising a list and identifiers of components detected within the system;

encrypting the qualification file in order to create a reference system qualification signature (RQS); and storing the reference qualification signature (RQS); and initiating preliminary to a transaction or to a service to be secured, a validation process for the purpose of generating a new system qualification file;

encrypting the new system qualification file in order to generate a checking signature; and comparing the checking signature with the reference signature and, in response to the comparison, allowing or denying access to the transaction or service.

18 Claims, 5 Drawing Sheets

PROCESS FOR SECURING THE ACCESS TO THE RESOURCES OF AN INFORMATION HANDLING SYSTEM (I.H.S.)

TECHNICAL FIELD OF THE INVENTION

The invention relates to Information Handling telecommunications and more particularly to a process and apparatus for securing access to an Information Handling System (IHS)

BACKGROUND ART

The constant progress of the communication systems and technology, particularly with the explosion of the Internet and intranet networks, has resulted in the development of an era of information and services. Nowadays, computers and, more generally, the Information Handling Systems (I.H.S.) such as the desktop computers, the laptop computers and any type of hand-held or portable systems can be used for accessing a wide variety of transactions or services, wherever the user or the customer of the new information era is.

This clearly raises the problem of the security of access to the source of information and, more generally, to the transaction and services.

In the new world of information, exemplified by the development of the Internet and intranet networks, security issues are becoming more and more critical.

Some techniques are already known for solving—at least partly—the problem of security of access to sensitive databases and, more generally, to any Information Handling System.

One of the first techniques which was used was the combination of the well-known user id and password which guarantees—up to a certain extent—that a user trying to access a predetermined system is an authorized user. Any user having neither user id nor the corresponding password will be considered as an unauthorized user and the access to the resource will be denied. While such a system has shown great efficiency in the past, it now shows to be clearly insufficient in the more recent systems.

The combination of the user identifier and the password was improved by the use of a specific smart card reader. In a more sophisticated way, the logon procedure is replaced (or completed) by the simultaneous use of a secure smart card reader in order to enable a remote system to make sure that the supposed user is the one who owns the authentication smart card. Clearly such a solution is a significant improvement brought to the security of the system, but it does not prevent any unauthorized modification or setting to the configuration of the system requesting access to the service.

More sophisticated systems were developed, based on the use of biometric identification or even the checking of some parameters internal to the user configuration, such as the Internet Protocol (I.P.) address of the customer home or office when the latter tries a connection to a remote system. Such systems provide partial solutions to some security issues, but do not provide an overall solution which can be used for a wide variety of IHS systems, based on multiple configurations, which encompasses as well as the user data and the internal configuration of the system.

No solution guarantees that the system has not been modified. Simple modifications, like adding devices such as USB data storage, or replacing a biometric reader by another device, may be harmful, as they allow bypassing of applications security.

Clearly, there is still a need for a global solution for improving security in computers and, more generally, IHS systems, based on a wide variety of machines and their various configurations.

SUMMARY OF THE INVENTION

It is an object of the present invention to improve security in the access of an Information Handling System (I.H.S.)

It is another object of the present invention to provide a process which is applicable to a wide variety of computers and machines, opened to different components and configurations, which significantly improves security brought to the access to a network or to a local service.

These and other objects are achieved by the process for securing the access to the resources of an Information Handling System (I.H.S.) in accordance with the present invention which involves the steps of:

- initiating a first preliminary qualification process for the purpose of generating a system qualification file (SQF) comprising a list and identifiers of components detected within the system;
- encrypting the qualification file in order to create a reference qualification signature (RQS);
- storing the reference qualification signature (RQS);
- initiating a validation process for the purpose of generating a new system qualification file prior to performing a transaction or to a service to be secured;
- encrypting the new system qualification file in order to generate a checking signature; and
- comparing the checking signature with the reference signature and, in response to the comparison, allowing or denying access to the transaction or the service.

The invention significantly increases the security of the system by involving two successive qualification and validation processes. The qualification process involves the generation of an encrypted signature which encompasses selected components of the hardware and software configuration of the machine for the purpose of generating a reference signature. In this way, the process becomes available for a great number of machines and configurations. Once generated, the second validation process uses the reference signature as a comparison element for the purpose of guaranteeing that no changes in the configuration were brought to the machine.

In one preferred embodiment, the system qualification file process is characterized in that the system qualification file is organized under a structured form, listing a set of generic components associated with component presence parameters (CPP) defining whether the presence of the component is mandatory, prohibited or optional.

Preferably, the qualification process is used for checking conformity of every component identified with the system with the corresponding Component Presence Parameter (CPP).

In one embodiment, during the qualification process, a system qualification file is created which is selected among a set of predefined templates corresponding to different levels of security or different applications.

Preferably, the system qualification file (SQF) comprises, for each generic component being listed, a set of fields which receives Component Identification Data (CID) identifying the component and Component Contextual Data (CCD) for storing data retrieved by the component.

The invention can be used for securing a transaction in a communication session between a system and a remote server. In that case, preferably, the reference qualification signature is stored within the server, which increases the security.

Alternatively, the invention can be used locally, by storing the reference qualification signature on a stand-alone computer and, therefore, the two successive qualification-validation processes permit securing the access to the resources of the system.

Typically, components such as a GPS receiver or biometric sensors can be used for increasing the level of security of the transaction.

DESCRIPTION OF THE DRAWINGS

An embodiment of the invention will now be described, by way of example only, with reference to the accompanying drawings, wherein.

DESCRIPTION OF THE PREFERRED
EMBODIMENT OF THE INVENTION

Figure 1:
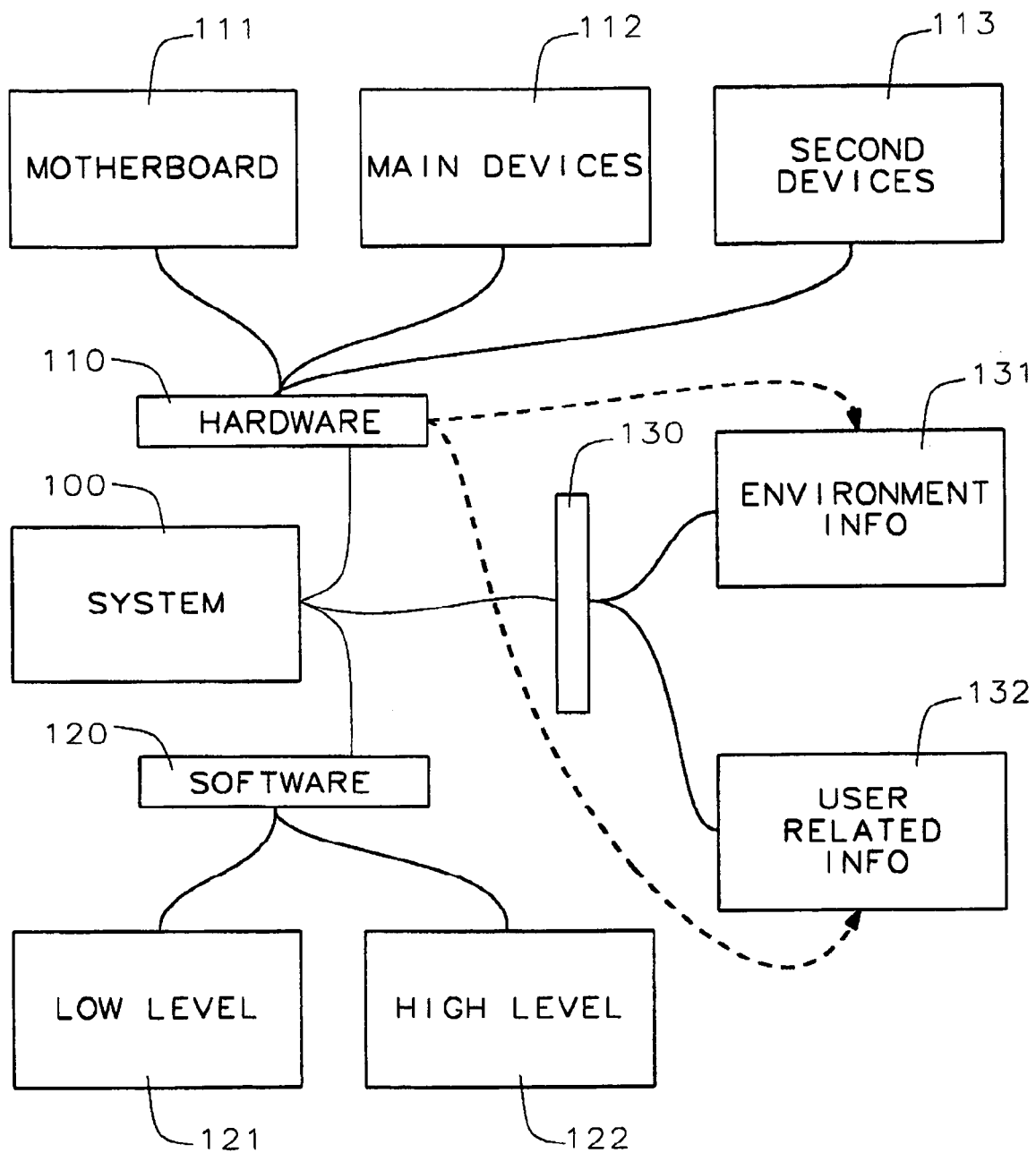
FIG. 1 illustrates a basic structure of an information handling system which can take advantage of the process according to the present invention.

The process and apparatus will be more particularly described in reference to FIG. 1 which illustrates a basic structure of a system for embodying the present invention.

Generally speaking, the system may be any Information Handling System or device which is equipped with processing resources. This clearly includes, without any limitation, desktop computers, portable computers and laptops, handheld or pocket PC's also known as Personal Digital Assistant (P.D.A.), and even the latest mobile phones equipped with processing resources.

FIG. 1 more particularly illustrates the structure and components of such a system 100 which, in the preferred embodiment, is a desktop or a laptop computer or any handheld/PDA computer fitted with hardware components 110 and software elements 120. Hardware components include a motherboard 111 fitted with a processor, memory, power and battery equipments, and a set of adapters or controllers as well as Input/output buses and ports. The motherboard cooperates with specialized adapters, such as Local Area Network (L.A.N.) or Wide Area Network (W.A.N) cards, or any specialized cards or adapters (video or audio) providing specialized functions and processing capabilities.

In addition to the motherboard, the system 100 further includes a set of external devices, such as the traditional main devices 112, i.e. the well-known display-keyboard-mouse equipment and some storage facilities (hard disks, floppy disks, CDROM or DVD ROM drives, etc.). The system may further includes secondary devices 113 attached to the motherboard via appropriate I/O ports, i.e., a printer, a scanner, video and photo equipment, communication devices (Bluetooth, WIFI, Infrared, telephony GSM-GPRS, modem), and even more specialized devices, such as a radio frequency identification (RFID) reader, a Smart Card reader, a biometric reader and, more generally, any other equipment which is likely to be a source of information.

System 100 is operated under the control of software code, which is organized in low-level code 121—the known Basic Input Output System (BIOS) code cooperating with the Operating System (O.S.) and higher level code 122 including special software components and applications. In the preferred embodiment of the invention, system 100 is operated under the well-known WINDOWS(™) operating system marketed by MICROSOFT Corp. A hand-held computer can be equipped with the WINDOWS CE (Trademark of Microsoft Comp.) operating system designed for pocket PCs. Clearly, those skilled in the art will adapt the invention to any alternate operating system, such as LINUX or PalmOS(™), for instance.

Considering now more particularly the information which system 100 may access through its general purpose and more specialized devices, it can be seen that system 100 is given access, via interface 130, to a wide range of information, such as contextual or environmental information 131 as well as user related information 132. Environment information 131 may be, without any limitation, information regarding Global Positioning System (G.P.S.), the date and the time, the relevant temperature of the room wherein the system is being operated, the phone line number provided by the modem adapter, the Media Access Control (MAC)/IP address assigned by the network adapter, and so on. User related information 132 may include data such as biometric data, PIN code, login-password, ID card or any personal information provided by the user.

As it is illustrated in FIG. 1, the system 100 is viewed as a set of hardware and software components which are combined together in order to provide the user with an access to some resources or the completion of a given transaction (for instance with a—not known—remote server).

The invention achieves high security in transaction or any service by systemically performing, prior to any transaction, a complete authentication procedure which includes both a qualification and a validation procedure.

During both the qualification and the validation procedures, all the components forming part of the hardware or software equipment of the system being authenticated are identified, checked and validated as will be described hereinafter with details.

Every component within system 100 is identified, registered and validated prior to the transaction or prior to accessing any secured service. In the frame of the subject invention, a component—is understood to encompass hardware and software elements which are constituents of the system. More precisely, a component is a constitutive element of a system. It can be a built-in card (motherboard, network adapter card), a microprocessor chip, a memory chip, a hard disk, and so on. More generally, a peripheral device (such as a biometric reader) and a software component or application program is considered to be a component.

In the preferred embodiment of the invention, every component is associated to component data which includes, without limitation, Component Identification Data (CID) and Component Contextual Data (CCD).

Component Identification Data (CID) is an identifier which uniquely identifies the component itself. Clearly, it can be any unique alphanumerical string which identifies the corresponding component, be it hardware or software.

It should be noticed that, in the technical field of computers, it is common practice to the product manufacturers and to the providers of individual parts to assign references which individually identify one particular element. For instance, each processor has a unique serial number; each installed software (under Windows(™) for example) (or software component such as Active X) has a Globally Unique Identifier (GUID) and/or a ClaSs IDentifier (CLSID). For the software GUID/CLSID, there could be no collision between two identifiers as they are built up to be unique in an OS. For the hardware components, a Computer ID could be created by concatenating the identifier of the manufacturer, the identifier of the model and the serial number of the component itself. Clearly, those skilled in the art will adapt the invention to any alternate operating system, such as LINUX.

Such identifiers are particularly used for permitting the different drivers corresponding to the different devices to be installed within a given operating system, for instance the Windows(™) type operating system.

The invention takes advantage of the already existing identifiers for improving security and authentication in the transactions and access to information handling systems.

In addition to Component Identification Data, the Component data further includes Component Contextual Data (CCD) which does not identify the component itself but are the data returned by the component when it is used. For instance, the CCD is the GPS coordinates on a specific request provided by a GPS device component. CID and CDD data may be combined for creating a complex contextual identification reference which will be used for authorizing or denying the access to the system 100.

This complex identification is used in a secured authentication process which involves two successive qualification and validation processes which substantially increase the security of access to the transaction or to the service. The first qualification process permits the generation of a Reference Qualification Signature (RQS) which is a snapshot of the authorized configuration of the system—covering both the component identifiers and possibly the contextual data provided by some components—which signature is used in a subsequent validation process for the purpose of authorizing or denying access to a transaction or to a service.

It can be seen that the invention can be used for a wide variety of systems and for a wide variety of applications, including financial, legal or economic applications involving access to sensitive data. In particular, it can be used in two different contexts, by securing a remote transaction between system 100 and a distant server or even, locally, by securing the use of system 100.

I. Qualification Process

Figure 2:
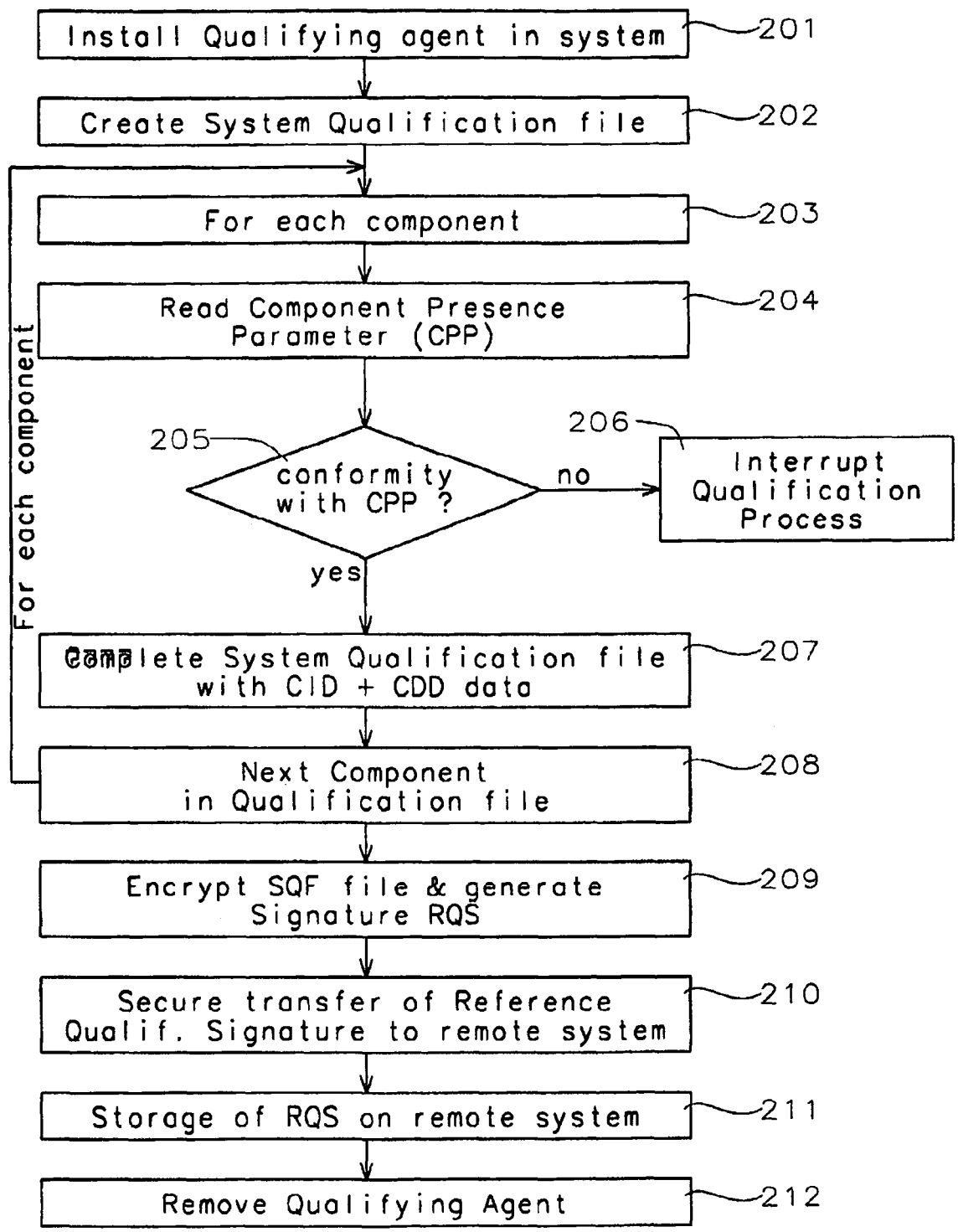
FIG. 2 and FIG. 4 respectively illustrate the qualification and the validation process of a first embodiment of the invention, operating in a client-server configuration.

FIG. 2 illustrates a first embodiment of a qualification process in a client-server configuration, where system 100 is used for accessing a transaction or a service from a remote server (not shown in the figure).

The Qualification process is initiated with a step 201 which consists of the installation of a so-called Qualifying agent which is installed within system 100. The setup of Qualifying agent can be achieved from different conventional ways: from a media as a CDROM or a floppy disk, or via a downloaded transfer (through a secure https internet connection, for example). When system 100 is operated under a Windows NT or Windows 2000 type operating system, it should be noticed that the administrative rights are required for achieving installation of the Qualifying Agent. For the more critical applications, it will be useful to reserve the execution of the Qualifying process described below only to specialized staff having administrative rights over the computer or system 100.

The Qualification process then proceeds with a step 202 where a so-called System Qualification File (SQF) is created which, in the preferred embodiment, takes the form of a extended Markup Language (XML) file which is ideally stored in a secured and temporary area of the system (for example in the memory or on the hard disk).

The SQF file presents a structured organization which allows storage of the data corresponding to the different components detected within system 100, which includes the Component Identification Data (CID) and, possibly, the Component Contextual Data (CCD) which can be returned by one or more particular components. All of the information will be combined in a same file which will be encrypted for the purpose of generating a reference qualifying signature providing enhanced security to the system.

The System Qualification File (SQF) is arranged as a template for an extended Markup Language (XML) file which is structured to provide space available for receiving, for every generic type of component, the CID and the CCD of the actual component detected and identified within the system. Preferably, the SQF file comprises, upon its creation, so-called Component Presence Parameters (CPP) which are predefined parameters associated with generic types of components (such as hard disk, motherboard, etc.) which will be used for securing, more particularly, both the Qualification and the Validation process and, thus, advantageously increasing the efficiency of the authentication process. The CPP parameters can be one of the following:

Mandatory: the corresponding component must be present within the system to permit full execution of the Qualification or the Validation process Optional: the component can be present or not. Its presence does not influence the execution of the Qualification or the Validation process Prohibited: the component cannot be present. Detection of the presence of the component will stop the execution of the Qualification or the Validation process.

More preferably, the SQF file is created by selecting one particular file among a set of predefined templates which correspond to different sets of profiles or different levels of security or qualification, or even to different applications which can be secured by the authentication process. That permits organizing different levels of qualifications with different configurations of components which will be detected, tracked and checked by means of their corresponding CPP parameters.

Preferably, a four-level classification is organized by means of four distinctive templates for the SQF file, as follows:

Qualification Level 1: confidential
Qualification Level 2: restricted
Qualification Level 3: critical
Qualification Level 4: Highly critical and/or each secured application may require its own template.

For clarity's sake, there will now be detailed three examples of SQF files corresponding to three different sets of qualifications.

The first example which is indicated below corresponds to one profile wherein the motherboard, the CPU and the RAM cannot be changed once the qualifying process is completed (TOFILL replaced with CID in the Fill Up Component Identifier data step 207).

```
<?xml version="1.0"?>
<Computer QualificationLevel="3">
    <motherboard CPP="mandatory">
        <CID>
            <manufacturer> TOFILL </manufacturer>
            <model> TOFILL </model>
            <chipset> TOFILL </chipset>
        </CID>
    </motherboard>
    <CPU CPP="mandatory">
```

-continued

```
    <CID>
        <manufacturer> TOFILL </manufacturer>
        <model> TOFILL </model>
        <speed> TOFILL </speed>
        <SN> TOFILL </SN>
    <CID>
    </CPU>
    <RAM CPP="mandatory">
    ...
    </RAM>
```

In this first example, the motherboard, the CPU and the RAM are defined to be "mandatory" and the field TOFILL will be replaced by the individual data extracted during detection of the components.

The second example shows a situation where no smartcard is allowed to be connected to the system 100 since the CPP parameter is set to 'prohibited', which prohibits the presence of such a component during the qualification or the validation processes.

```
<?xml version="1.0"?>
<Computer QualificationLevel="2">
...
...
    <SmartCardReader CPP="prohibited">
    </SmartCardReader>
</Computer>
```

In the third example below, there is shown a profile which is more accurate on later modifications and offers a new level of security since it stores in a data section the data provided by the GPS component. It can be seen that the geographical x, y coordinates provided by a GPS component are retrieved from that component and stored within the System Qualification File. To increase the level of security, the GPS component is assigned a "mandatory" CPP parameter and the SQF file contains a <CCD> section with attributes which define some predefined geographical ranges already contained in the file.

```
<?xml version="1.0"?>
<Computer QualificationLevel="1">
...
    <GPS CPP="mandatory">
        <CID>
            <manufacturer> TOFILL </manufacturer>
            <model> TOFILL </model>
            <SN> TOFILL </SN>
        <CCD>
            <Lattitude RangeMin="-10" RangeMax="+30">
            TOFILL </Lattitude>
            <Longitude RangeMin="-50" RangeMax="+50">
            TOFILL </Longitude>
        </CCD>
    </GPS>
```

Clearly, the three examples which are discussed above should be only considered for illustration purposes, without any limitation, in order to demonstrate the great versatility and the wide possibilities offered by the process of the invention.

Referring back to FIG. 2, one sees that when the SQF file is created from one predefined template discussed above, the process proceeds with a step 203 which is an entering point for a loop, based on steps 203-208, which is used for detecting, tracking and registering the different components which can be detected within system 100 in accordance with the structure of the SQF file which was created in step 202.

For each component being considered within step 203, the process refers to the QSF and extracts thereof—if any—the corresponding Component Presence Parameter (CPP) from the QSF. That value is read in a step 204.

Then, in a step 205, the process checks the conformity of the system with the CPP parameter corresponding to the component being considered. This is achieved by detection of the list of components existing in the system and comparing the list with the contents of the XML structure of the SQF file.

Those skilled in the art can use different methods and processes available for determining the particular components which are present within system 100. In one embodiment, the qualifying process extracts system information directly from the SMBIOS tables, or interrogates the Distributed Management Interface (DMI), or Windows Management Instrumentation (WMI) as known from Microsoft. As known by those skilled in the art, the DMI interface is an Application Programming Interface (API) that consists of a set of routines that are called for accessing the information stored within the BIOS layer. Basic information relating to the DMI programming interface can be found at the address http://www.dmff.org/spec/html.

By using the DMI or WMI interface, or by accessing directly the SMBIOS level, the Qualifying process accesses the different tables contained in the System Management BIOS (SMBIOS) for the purpose of reporting comprehensive information regarding the user's preferred software configuration, and required for completing a request for transaction. Such information includes the type of processor, the type of chipset, the number of hard disk drives, the particular graphic card being used, the serial number of the display, the reference of the operating system and so on.

Below there is illustrated the determination, from the API known from Windows(™), of the identification of the hard disk of system 100:

```
BOOL GetVolumeInformation(
    LPCTSTR lpRootPathName,
    LPTSTR lpVolumeNameBuffer,
    DWORD nVolumeNameSize,
    LPDWORD lpVolumeSerialNumber,
    LPDWORD lpMaximumComponentLength,
    LPDWORD lpFileSystemFlags,
    LPTSTR lpFileSystemNameBuffer,
    DWORD nFileSystemNameSize
);
```

Similarly, the process may access the BIOS level to determine the different components, such as follows:

```
class Win32_BIOS : CIM_BIOSElement
{
    uint16 BiosCharacteristics[ ];
    string BIOSVersion[ ];
    string BuildNumber;
    string Caption;
    string CodeSet;
    string CurrentLanguage;
    string Description;
    string IdentificationCode;
    uint16 InstallableLanguages;
    datetime InstallDate;
    string LanguageEdition;
```

```
        String ListOfLanguages[ ];
        string Manufacturer;
        string Name;
        string OtherTargetOS;
        boolean PrimaryBIOS;
        datetime ReleaseDate;
        string SerialNumber;
        string SMBIOSBIOSVersion;
        uint16 SMBIOSMajorVersion;
        uint16 SMBIOSMinorVersion;
        boolean SMBIOSPresent;
        string SoftwareElementID;
        uint16 SoftwareElementState;
        string Status;
        uint16 TargetOperatingSystem;
        string Version;
    };
```

Those are only examples showing how easy it is to gather valuable information regarding the different components forming a system, and to derive the CID and CCD information which are to be introduced within the SQF file.

Referring back to FIG. 2, one sees that if conformity is not satisfied in step 205, then the process proceeds to a step 206 which interrupts the qualification process. Clearly, this means that system 100 will be considered as being a NON QUALIFIED system which can be used for normal or routines tasks but certainly not for accessing sensitive or critical information or transactions. This is a great advantage of the process of the invention which permits modifications to be brought to one computer (for instance by plugging some external devices) and continuing to use the system for "normal" and routine tasks. Conversely, when the system is applied for qualification, the system will have to be in a predefined condition—including hardware and software configuration—to allow completion of the qualification process and the creation of the reference signature which will be discussed below.

If conformity is satisfied, then the process proceeds to a step 207 where the information associated with the corresponding component, i.e. the Component Identification Data (CID) and the Component Contextual Data (CCD) retrieved from the component, is precisely introduced at the appropriate location (field FILLIN) within the XML structure of the SQF file. If one component is a biometric captor, then the CID will identify the captor while the CCD may consist, for instance, of a raw bitmap image of a fingerprint of the user. It consequently integrates user data into the gathered information inside the qualifying protocol file template. Similarly, should one component be a GPS receiver, the qualifying process reads the receiver hardware identifiers (CID) and the GPS data provided by the receiver (CCD) and such information is stored within the XML structure of the SQF file.

The process then proceeds with a step 208 where the next component in the template of the SQF file will be considered, and the process goes back to entry point 203.

When all the components have been processed, the process proceeds with a step 209 where the System Qualification File (SQF) is encrypted by a cryptology algorithm (such as RSA, PGP, and so on, based on public and private keys). The particular encryption mechanism which is used is not part of the present invention and will not be further developed. Clearly, those skilled in the art will adapt the invention to any known encryption algorithm.

The result of the encryption process permits derivation of a so-called Reference Qualifying Signature (RQS) which permits the whole configuration of the system—including hardware and software components (CID) and even contextual data (CDD) to be stored within the same signature.

It was described that the CID and CCD data were introduced within the template of the SQF file in order to derive one unique completed SQF file. Alternatively, the originating SQF file may remain as a template and the CID and the CDD data may be stored into a separate file, which results in the generation of two encrypted files: a first file containing the CPP defining the level of qualification and a second file containing the CID and CDD data retrieved from all the components. But, preferably, the Qualification process generates one unique Reference Qualification Signature (RQS)—based on one unique encrypted SQF file—which encompasses CPP, CID and CID data.

In a step 210, the process then performs a secure transfer of the RQS signature to the remote system and the latter is then stored in a step 211. Preferably, the RQS, reference qualifying signature, is sent via common secured remote protocols (such as HTTPs, VPN, and so on). The remote server then stores the qualifying signature relatively to the system (in a database or a XML file) in order to be able to access to this information during a subsequent Validation process.

The Qualification process then performs in a step 212 the removal of the Qualifyng agent from system 100 and the Qualification process is completed.

Figure 3:
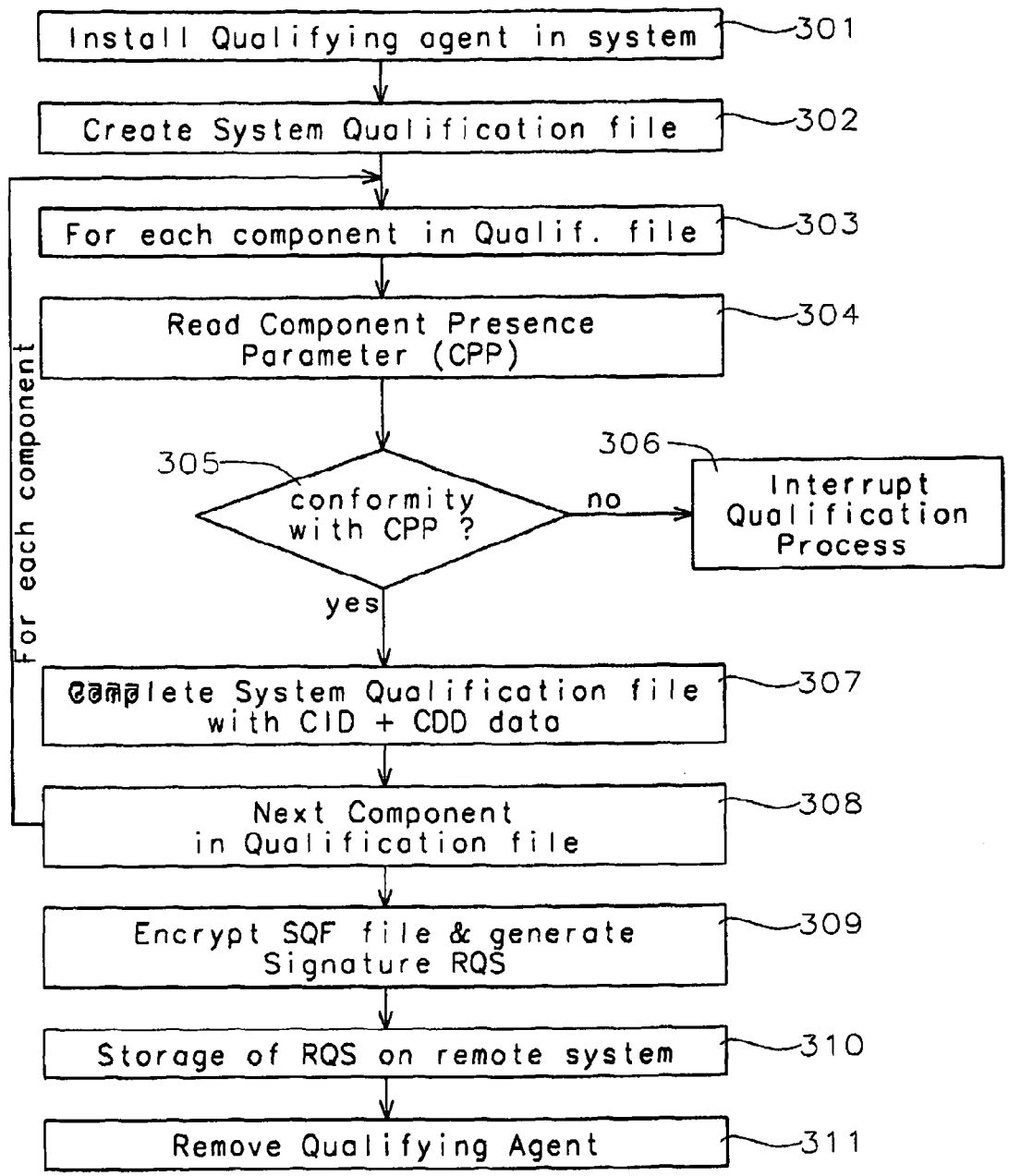
FIG. 3 and FIG. 5 respectively illustrate a second embodiment of the invention where the qualification and a validation processes are only executed locally within system 100.

FIG. 3 illustrates an alternate embodiment where the Qualification process is used for increasing security of use of a system, considered per se, i.e. irrespectively of any connection to any server.

Steps 201 to 209 are respectively the same as steps 301 to 309. After encryption of the SQF file, the process then stores the latter in a protected area of the system in a step 310. Then, in a step 311, the process proceeds with the suppression of the qualifying agent from the system.

Therefore, the two embodiments which are respectively illustrated in FIG. 2 and FIG. 3 differ from one another by the fact that, in one case, the Reference Qualifying Signature RQS is stored within the system while, in the other case, it is uploaded to the remote server which certainly increases the level of the security.

It can be observed that the Qualification process which was described above substantially increases the level of the security since all the components constituting the system 100 are carefully detected, checked and their internal CID and CCD retrieved in accordance with the predefined System Qualification File SQF. In particular, any system which does not fully comply with the requirements listed in the SQF file—and particularly the Component Presence Parameters (CPP) therein defined—will not be qualified to provide a secured transaction or access to the system.

This significant advantage results from the combination, to the qualification process which was described above, of a validation process which takes into consideration the reference signature which was previously generated.

II. Subsequent Validation Process

In addition, authentication of the system 100 is substantially improved by use of the validation process which will now be described and which, again, will execute a complete checking of a system applying for validation, prior to allowing such system to complete any transaction or to access critical data.

Figure 4:
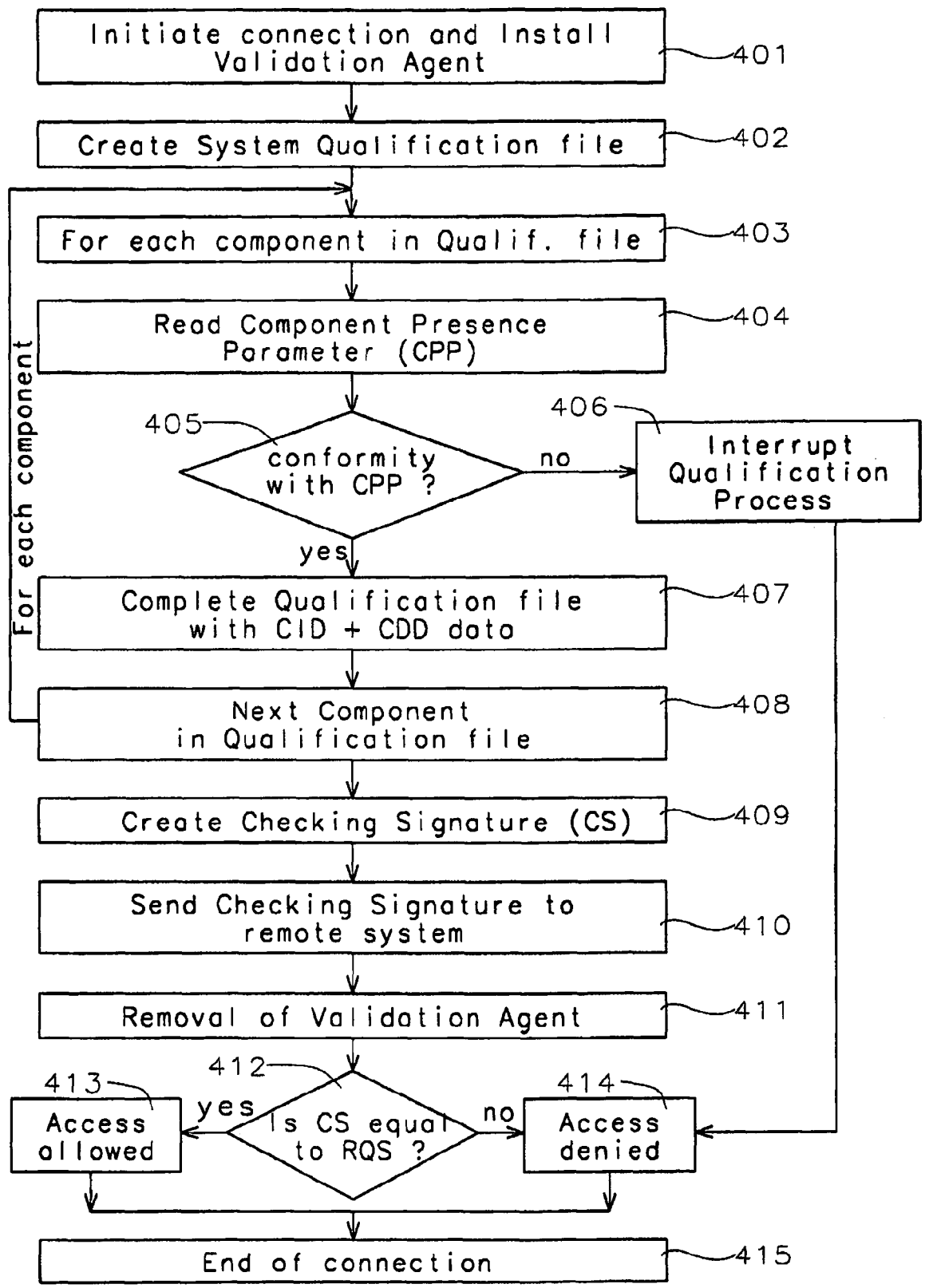

FIG. 4 illustrates the validation process of the invention in a client server configuration.

The validation process starts with a step 401 where, similarly to step 201 of FIG. 2, a validation agent is installed within the system requesting a transaction with the server or any kind of remote service.

The process then proceeds with a step 402 where the validation agent creates a System Qualification File SQF corresponding to the level of qualification which is required from the system 100. Preferably, the process generates a template having the same structure as the template used in step 202 of FIG. 2, and thus having corresponding Component Presence Parameters (CPP).

The process then proceeds with a step 403 which is an entry point of a loop 403-408 used for separately processing all the components conforming to the list identified within the SQF file.

In a step 404, the validation process extracts the CPP parameter from the template and, in a step 405, it performs a detection operation (by using similar methods as those discussed above) for checking conformity of the actual system to the CPP listed.

If the conformity checking fails, then the validation is interrupted in a step 406 and then access to the transaction or to the resource is denied to the user, in a step 414.

Conversely, if the conformity checking succeeds in step 405, then the process proceeds with a step 407 where the CID and CCD data are retrieved from the corresponding component and used for filling the SQF files.

Step 408 is used for considering the next component within the list of generic components defined in SQF file and the process returns back to step 403 for processing this new component.

When all the components have been processed, the process then proceeds with a step 409 which encrypts the fully completed SQF file in order to generate a Checking Signature (CS) therefrom.

Then, the process proceeds with a step 410 where the checking signature (CS) is transmitted to the remote server.

Step 411 is an optional step where the validation agent can be removed from the system applying for validation.

Then the process proceeds with a step 412 where a test is performed on the server in order to determine whether the checking signature CS is equal to the Reference Qualifying Signature which was computed during the Qualification process of the system and stored within the remote server.

In one preferred embodiment, the remote server generates a temporary session ID (or a time stamp) on step 401 which will be also checked in step 412. If the session ID has expired (for example, it can be for a time out reason between steps 401 and 412), the access will be denied. This additional procedure improves the security.

If the test succeeds, then this means that the system applying for validation fully complies with all the requirements contained within the encrypted (and thus protected) SQF file. In particular, this ensures that all the CID and the CCD (including the biometric or GPS coordinates when applicable) are fully compliant.

Access to the transaction or to the service is thus authorized in a step 413 and the validation process then completes in a step 415 which can be the end of the connection.

Conversely, if the test of step 412 fails, that means that the system 100 is not fully compliant with the requirements listed within the RQS stored within the server, for instance because some internal parts of the system were changed or the user is not the registered user, and thus access to the transaction or to the service is denied in a step 414. The process then proceeds with step 415 which is the end of the validation process.

Figure 5:
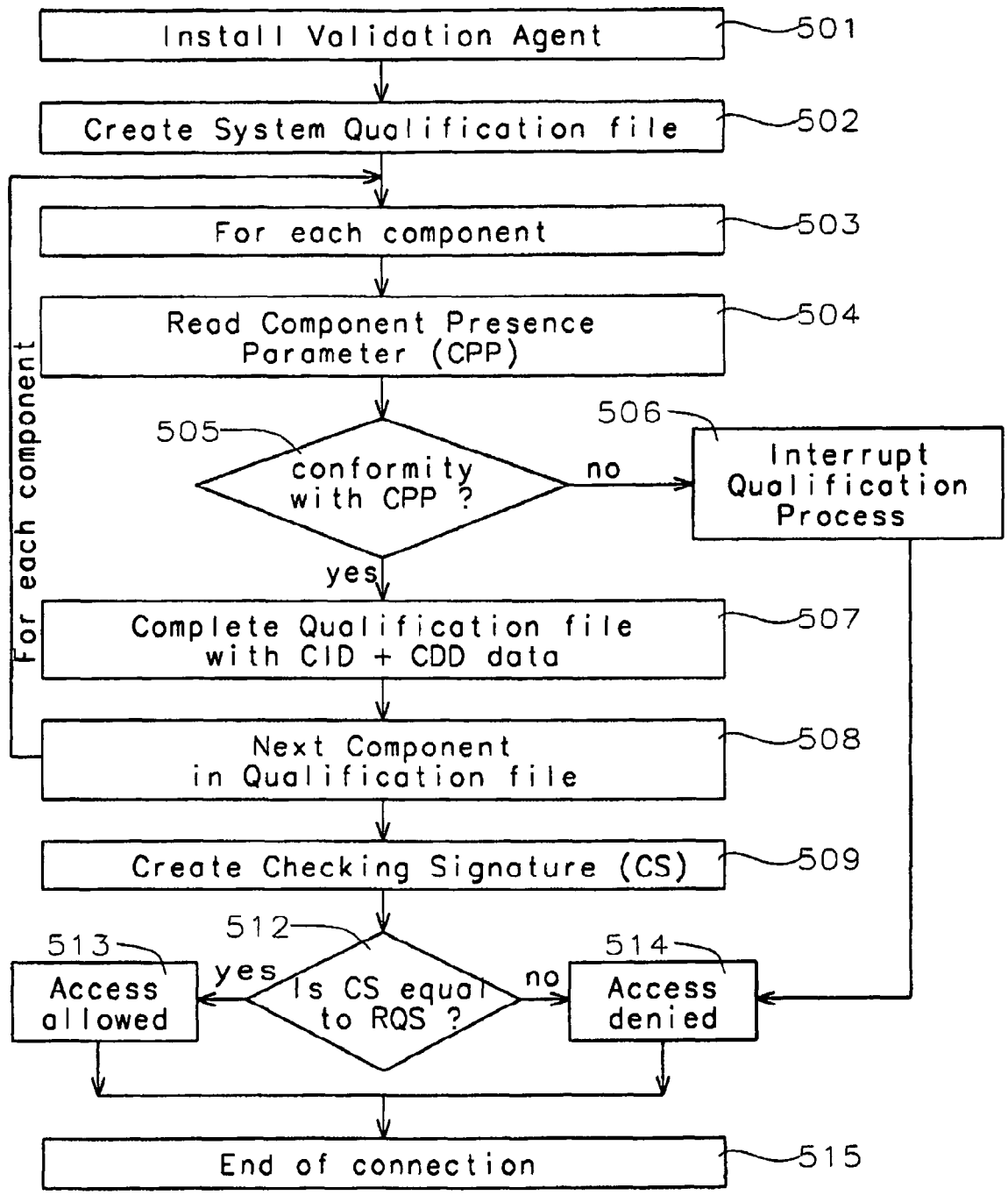

FIG. 5 shows an alternate embodiment of the validation process which is used in a local configuration for the purpose of securing an access to system 100 assumed to be in a stand-alone configuration.

The validation process involves steps 501-509 which are identical to steps 401-409 of the validation process in the remote configuration. Indeed, a validation agent is installed (step 501) for the purpose of creating a SQF file on the system (step 502) and, for each component having a type listed within the SQF file, the CPP parameters are read (step 504), then checked for conformity (step 505). The CID and the contextual CDD data are then retrieved for the purpose of filling the SQF file.

When the Checking Signature (CS) is generated in a step 509, then the process directly goes to a step 512 where the Reference System Qualifying Signature is read from the local storage and compared to the checking signature in a step 512.

If the comparison succeeds, then the process goes to a step 513 where the access to the transaction or to the service is allowed.

Conversely, if the test of step 509 fails, then the validation process proceeds with a step 514 where access to the transaction or to the service is denied to the system 100.

The validation process then completes in a step 515.

It has been described how it becomes possible to efficiently increase security of access to a system by generating the so-called reference system qualifying signature encompassing all the hardware and software components, as well as the Contextual Component Data, as using such signature in the validation process. This is a very advantageous deviation of the traditional signatures attached to the individual components of the known Windows operating system where the signature is used for detecting corruption of the corresponding component, for the purpose of replacing any corrupted component by a new version.

In the invention, the Reference system qualifying signature is not provided by the product manufacturer of the component, but is automatically generated by the new qualifying process which was described above, for the purpose of providing a reference which can be used within the validation process and thus secure the access to the IHS system or to the transaction.

III. Application of the Invention

It should be noticed that the invention which was described above can be used in a range of applications.

The invention can be directly applied to the use of a national ID card. Indeed, some countries, including France, are reconsidering the generalization of a new type of ID card which integrates an electronic chip to contain digital biometric data of the bearer. In France, in order to enable city halls to collect the biometric data of the citizens who order an ID card, the government provides mobile equipment, which is transported from city hall to city hall, to record the information. Needless to say, it is essential that this mobile equipment should not be tampered with, in order to make sure that it is only used by authorized administration personnel, and that recorded biometric information is not modified or unduly extracted after recording. Only approved systems and users should then be allowed to record and transmit information to the central server which controls the production of ID documents. The integrity of the whole chain should be checked and the process should be fully traceable.

More generally, biometric information generalized on passports is underway. To protect the privacy of traveling citizens, it is important to make sure that their biometric data are not collected unduly when they identify themselves. Therefore, only qualified and fully validated systems should be used for processing such information, and the integrity of the systems should be checkable.

Further, judicial and police departments in Europe will soon have access to the European criminal record of all citizens. They will also access the Schengen (SIS) data bases. It is important to:
1. make sure that only authorized personnel access these data bases
2. enable tracing of accesses
3. enforce even stricter regulations to control who modifies the content of the data bases.

The identity of the personnel will therefore be controlled, via a safer mechanism than just a login/password. The use of biometric ID cards is likely to be adopted. The data access will be performed both via fixed and mobile terminals. In all cases, it is necessary to enable the server to verify that the system has not been tampered with, enabling, for example, bypassing the biometric check or diverting the consulted data. The hardware and, to some extent, the software of the consultation terminal must be checkable by the server before granting access to the data.

The invention can also be used for providing efficient warranty service by a product manufacturer. In case of rental of a computer, for instance, it can be of interest for the company providing the system to be sure that the system is identical when it returns from leasing with respect to the configuration it had when it was shipped to the client. When a computer (or any electronic server) is sold, the invention provides a fast and easy way to check if the computer has been opened and modified by the customer. It definitely replaces the old and unsafe warranty sticker.

During the rental time, the innovation provides a technical solution for securing unauthorized changes by remote checks. This is particularly valuable for some applications when it is desired that no unauthorized modification occurred in one computer or one system, from a preconfigured, predefined and registered setting. New possibilities for leasing or for commercial rental are made possible with the invention.

Another advantage of the use of the invention is the possibility to control the access to the service from the physical location of a machine.

What is claimed is:

1. A process for securing the access to the resources of an Information Handling System (I.H.S.), comprising an operating system (OS), said process involving the steps of:
   initiating a qualification process of said system, said qualification process involving the steps of:
   identifying by said operating system (OS) hardware components present within said system and reported by said operating system (OS) and completing a system qualification file (SQF) listing said hardware components with corresponding Component Identification Data (CID), based on the information used by said operating system (OS) for installing the drivers corresponding to said hardware components, said information including the identifier of the manufacturer, the identifier of the model of the component, and the serial number;
   encrypting said system qualification file in order to create a reference qualification signature (RQS);
   performing a secure transfer of said RQS signature to a remote server;
   storing said reference qualification signature (RQS) on said remote server; using said reference qualification signature preliminary to any transaction or any access to be secured, by executing a validation process which involves the steps of:
   performing a new identification and detection of the hardware components and a subsequent generation of a new system qualification file;
   encrypting said new system qualification file in order to generate a checking signature;
   sending said checking signature to said remote server; and
   comparing said checking signature with said reference qualification signature (RQS) on said remote server and, in response to said comparison, allowing or denying access to said transaction or said service.

2. The process according to claim 1 wherein said system qualification file is organized under a structured form, listing a set of generic component associated with component presence parameters (CPP) defining whether the presence of said components is mandatory, prohibited or optional.

3. The process according to claim 2 wherein said qualification process or said validation process checks the conformity of every component identified with said system with the corresponding component presence parameter (CPP).

4. The process according to claim 2 wherein said system qualification file comprises, for each generic component being listed, a set of fields which receives Component Identification Data (CID) identifying said component and Component Contextual Data (CCD) for storing data retrieved by said component.

5. The process according to claim 4 wherein one component is a GPS receiver which provides CID identifying said receiver and which provides ranges of (x,y) coordinates which are used and stored into said system qualifying file as component contextual data (CCD).

6. The process according to claim 5 wherein one component is a biometric sensor providing CID data identifying said sensor and biometric data which are used as CCD stored into said system qualification file.

7. The process according to claim 4 wherein one component is a smartcard reader providing CID data identifying said sensor and smartcard data which are used as CCD stored into said system qualification data.

8. The process according to claim 1 wherein said qualification process generates a system qualification file which is chosen between a set of predefined templates corresponding to different levels of security or different applications.

9. The process according to claim 1 wherein said reference qualification signature is removed from said system.

10. The process according to claim 1 wherein a validation session request is time limited by a predetermined period and wherein said remote server caused said validation process to fail after expiration of said period.

11. The process according to claim 1 wherein said qualification process and said validation process are carried out by a security computer program.

12. A security computer program for securing the access to the resources of an Information Handling System (HIS) comprising an operating system (OS), said computer program residing on a non-transitory computer-readable medium and having program code elements comprising:
   a qualifying agent performing the steps comprising:
   identifying by said operating system (OS) hardware components present within said system and reported by said operating system (OS) and completing a system qualification file (SQF) listing said hardware components with corresponding Component Identification Data (CID), based on the information used by said operating system (OS) for installing the drivers corresponding to said hardware components;
   encrypting said system qualification file in order to create a reference qualification signature (RQS);

performing a secure transfer of said RQS signature to a remote server;

storing said reference qualification signature (RQS) on said remote server;

a validation agent using said reference qualification signature preliminary to any transaction or any access to be secured, comprising the steps:

performing a new identification and detection of said hardware components and a subsequent generation of a new system qualification file;

encrypting said new system qualification file in order to generate a checking signature;

sending said checking signature to said remote server; and comparing said checking signature with said reference qualification signature (RQS) on said remote server and, in response to said comparison, allowing or denying access to said transaction or said service.

13. The computer program according to claim 12 wherein said system qualification file is organized under a structure form, listing a set of generic components associated with component presence parameters (CPP) defining whether the presence of each of said components is mandatory, prohibited or optional.

14. The computer program according to claim 13 wherein said qualifying agent or said validation agent checks the conformity of every component identified with said system with the corresponding component presence parameter (CPP).

15. The computer program according to claim 13 wherein said system qualification file comprises, for each generic component being listed, a set of fields which receives Component Identification Data (CID) identifying said component and Component Contextual Data (CCD) for storing data retrieved by said component.

16. The computer program according to claim 12 wherein said qualifying agent generates a system qualification file which is chosen between a set of predefined templates corresponding to different levels of security or different applications.

17. The computer program according to claim 12 wherein said reference qualification signature is removed from said system.

18. The computer program according to claim 12 wherein a validation session request is time limited by a predetermined period and wherein said remote server caused said validation process to fail after expiration of said period.

* * * * *